(12) United States Patent
Numa-Beaujour (10) Patent No.: US 11,220,398 B2
(45) Date of Patent: Jan. 11, 2022

(54) INTERMODAL CONTAINER REDUCING THE POLLUTION OF THE ENVIRONMENT

(71) Applicant: Sylvia Numa-Beaujour, Levallois-Perret (FR)

(72) Inventor: Sylvia Numa-Beaujour, Levallois-Perret (FR)

(73) Assignee: Sylvia Numa-Beaujour, Levallois-Perret (FR)

( * ) Notice: Subject to any disclaimer, the term of this patent is extended or adjusted under 35 U.S.C. 154(b) by 496 days.

(21) Appl. No.: 15/561,198

(22) PCT Filed: Mar. 24, 2016

(86) PCT No.: PCT/FR2016/050667
§ 371 (c)(1),
(2) Date: Sep. 25, 2017

(87) PCT Pub. No.: WO2016/151258
PCT Pub. Date: Sep. 29, 2016

(65) Prior Publication Data
US 2018/0065798 A1    Mar. 8, 2018

(30) Foreign Application Priority Data
Mar. 25, 2015 (FR) ...................... 1552496

(51) Int. Cl.
*B65D 88/12* (2006.01)
*B65D 90/00* (2006.01)
(Continued)

(52) U.S. Cl.
CPC ........... *B65D 88/121* (2013.01); *B65D 90/00* (2013.01); *B65D 90/0046* (2013.01);
(Continued)

(58) Field of Classification Search
CPC .. B65D 88/121; B65D 90/38; B65D 90/0053; B65D 90/0046
See application file for complete search history.

(56) References Cited

U.S. PATENT DOCUMENTS

| 4,762,231 A | 8/1988 | Kiselewski |
| 7,183,115 B1 * | 2/2007 | Lauglin ............. G01N 33/0073 422/83 |

(Continued)

FOREIGN PATENT DOCUMENTS

| BE | 731710 A | 10/1969 |
| CA | 2114613 A1 | 3/1993 |

(Continued)

OTHER PUBLICATIONS

International Search Report for International Application No. PCT/FR2016/050667 dated Jun. 6, 2016, 3 pages.

(Continued)

*Primary Examiner* — Regis J Betsch
*Assistant Examiner* — Jeremy A Delozier
(74) *Attorney, Agent, or Firm* — TraskBritt (57) ABSTRACT

A device forming a stackable container that can be used to transport products includes a portion forming a crate defining a base and four side walls and a top wall, secured to one another in a sealed manner, made mainly of a plastic material; a door for sealingly closing the crate, forming with the crate, when closed onto same, a sealed box; a system for drawing and compressing gases contained in the closed box; and at least one tight casing for storing the drawn and compressed gases, rigidly connect to the box and forming a bracing frame during transport and a flotation buoy when the container is immersed in water.

23 Claims, 7 Drawing Sheets

(51) Int. Cl.
*B65D 90/38* (2006.01)
*B65D 90/22* (2006.01)
*G01G 19/58* (2006.01)

(52) U.S. Cl.
CPC ......... *B65D 90/0053* (2013.01); *B65D 90/22* (2013.01); *B65D 90/38* (2013.01); *B62B 2203/50* (2013.01); *G01G 19/58* (2013.01)

(56) References Cited

U.S. PATENT DOCUMENTS

| | | | | |
|---|---|---|---|---|
| 2006/0131350 | A1* | 6/2006 | Schechter | A61M 15/009 222/645 |
| 2006/0230704 | A1* | 10/2006 | Lambreth | E04B 1/34 52/745.02 |
| 2008/0297346 | A1* | 12/2008 | Brackmann | B60P 3/03 340/572.1 |
| 2013/0239523 | A1* | 9/2013 | Scudder | B65D 88/1606 53/467 |
| 2016/0301118 | A1* | 10/2016 | Chami | H01M 10/0431 |

FOREIGN PATENT DOCUMENTS

| | | |
|---|---|---|
| CN | 102756864 A | 10/2012 |
| CN | 103395573 A | 11/2013 |
| EP | 1179978 | 4/2007 |
| FR | 2649682 A1 | 1/1991 |
| FR | 2971777 | 8/2012 |
| FR | 3005938 | 11/2014 |
| GB | 2089325 A | 6/1982 |
| NL | 9401027 A | 2/1996 |

OTHER PUBLICATIONS

International Written Opinion for International Application No. PCT/FR2016/050667 dated Jun. 6, 2016, 6 pages.
Chinese First Office Action for Chinese Application No. 201680023544, dated Nov. 23, 2018, 9 pages with English Translation.
Chinese Search Report for Chinese Application No. 201680023544, dated Nov. 15, 2018, 2 pages.

* cited by examiner

INTERMODAL CONTAINER REDUCING THE POLLUTION OF THE ENVIRONMENT

CROSS-REFERENCE TO RELATED APPLICATIONS

This application is a national phase entry under 35 U.S.C. § 371 of International Patent Application PCT/FR2016/050667, filed Mar. 24, 2016, designating the United States of America and published as International Patent Publication WO 2016/151258 A1 on Sep. 29, 2016, which claims the benefit under Article 8 of the Patent Cooperation Treaty and under 35 U.S.C. § 119(e) to French Patent Application Serial No. 15/52496, filed Mar. 25, 2015, the disclosure of each of which is hereby incorporated herein in its entirety by this reference.

TECHNICAL FIELD

The subject matter of the present disclosure is an intermodal container for storing and transporting solid products packaged or in dry bulk.

BACKGROUND

An intermodal container is a box (preferably a parallelepiped), generally made from steel, provided with an internal wooden floor, standardized, used for storing and transporting goods and reusable, for example, as a habitat (see FIGS. 1 to 5).

The system for the intermodal transport of containerized goods is worldwide and allows safe and effective circulation of goods.

The term "intermodal" indicates that the container can be moved from one transport method to another (sea, river, rail, road) without rupture of load, that is to say without unloading and reloading the content of the container.

The containers each have a unique identification mark governed by ISO 6346; their length varies in general from 8 feet (2.438 m) to 56 feet (17.07 m) and their height from 8 feet (2.438 m) to 9 feet 6 inches (2.9 m).

The capacity of the containers is often expressed in units equivalent to twenty feet (capacity equal to a standard length of 6.10 m×width of 2.44 m). They will be referred to hereinafter as "ISO containers" since they must conform to the ISO requirements in force at the time of manufacture thereof; for example, with regard to transport in order to allow transport by truck, train, boat and/or barge. Reference can also be made to ISO 668:1995 (which defines containers of 10, 20, 30 and 40 feet).

This is because the container was invented in 1956 by Malcolm McLean and has undergone few changes since its invention.

The 20 foot container, the most widely used, is entirely hermetic and watertight by virtue of the seals. It is provided with rigid walls with at least one door. It is generally used for transporting solid goods, grains or powders that do not need a regulated temperature. Chemical products, electronic machines, craft products, drugs, everyday products, instrument parts and fabrics may also be transported therein. Many current products manufactured with high added value travel in containers.

A container for solid goods made from stainless steel has the following advantages:
high strength,
good resistance to rust and corrosion,
but requires high investment, and this is why it is not commonly employed.

The container for solid goods may also be made from aluminum, in accordance with two types:
one is the type with a steel frame and aluminum plates, and
the other type is formed completely of aluminum but for the ends of the frame, which are formed of steel.

In this case, the container is lightweight, and this is often the case with containers used in air transport. It has superior resistance to rust and beautiful appearance as well as good elasticity. On the other hand, it is expensive to construct and lacks strength.

Finally, the most common containers are made from a weathering steel (e.g., COR-TEN® steel, which is commercially available from American Sheet and Tin Plate Company Corporation of Pittsburgh, Pa.), which is resistant to corrosion and easy to repair.

A traditional container may give rise to various nuisances and constraints:
—Marine Pollution When a boat transporting containers wrecks, the contents thereof, and the protective coatings/paints thereof, may spill into the sea, and they may be toxic for marine fauna and flora. When they float, even their presence in the sea presents danger to navigation, and, when they sink and become unrecoverable, cause damage for an undetermined period to marine fauna and flora.

—Terrestrial Pollution

Because of poor distribution of the load and/or excessive weight of containers, a truck trailer may tip over on the motorway, a car on a railway, a pile of containers falling from a river barge or from a ship, in a river, causing not only accidents but also terrestrial, river and ultimately marine pollution.

—Danger to Health for Workers and Consumers

The gases used for fumigation, that is to say for destroying harmful living organisms contained in the wooden floor of containers and/or the products being transported, are particularly toxic to humans by inhalation (hydrocyanic acid, methyl bromide, phosphorus hydride, etc.) or carcinogenic (bromomethane, benzene, or 1,2-dichlorethane).

However, fumigation appears to be essential in order to prevent the propagation of harmful elements by transport.

However, these fumigation gases are sometimes contained within the container without any indication of their presence. As a result, many workers are exposed to these toxic gases without any protection, without any prior information, and without realizing that they have been exposed.

Furthermore, these gases may mix with those released by the products being transported and form explosive mixtures that can explode when the container is opened.

The constraint relating to the maintenance of these containers, which may represent sometimes one third (⅓) of the cost of the container (change of floor, paint, welding, etc.) in order to be in a position to guarantee a good seal despite the vulnerability of the rubber seals (vis-à-vis sea spray), let alone the financial impact due to the down time in commercial use thereof. The service life of a container, even when correctly maintained, does not typically exceed 10-15 years.

To solve the problem of marine pollution, the French patent FR 2 971 777 proposes a container that can be transformed into a self-contained floating structure that facilitates recovery thereof at sea, accelerates it and thus prevents its content or cladding from polluting. This container may be produced from polymer or composite material, a lightweight material enabling it to float better. This container is formed by a stack of boxes, at least one of which is central, the boxes being connected together in order to form, when deployed with respect to one another, a rigid floating structure having a longitudinal dimension and/or a transverse dimension greater than that of the container in its non-deployed position.

However, this container solution consisting of the association of boxes involves compartmentalization of its internal space, which does not suit the transport of certain products and does not solve the problems of hazard to health, and danger during the aforementioned land transport.

To solve the problem of the distribution of the load within the container, thus preventing dangers related to the land transport of containers, the document FR 3 005 938 proposes a container, the length of which can be modified between a maximum length used for a maximum load (for example, during an outward delivery voyage) and a minimum length used for a minimum load (for example, during the return voyage when the container has been emptied of the initial goods, which have been replaced by other less bulky ones). This container may also be produced from plastics material, which facilitates maintenance thereof.

Though this solution appears relatively satisfactory in terms of reduction of hazards related to the transport itself, it is, however, tacit on the problems related to the health of workers and consumers.

In addition, the document EP 1 179 978 proposes a container for marine transport, the internal space of which is divided into a fumigation chamber, in which the products to be transported and fumigated are disposed, and a chamber for controlling the fumigation. Once the fumigation has been carried out, in order to reduce the toxicity of the internal space of the container, the gases are purified by an active carbon absorption bed before being discharged to the external atmosphere by a fan. However, the solution of discharging these gases into the atmosphere, even after purification, is not satisfactory from an environmental point of view (risk of saturation of the filter, of mediocre purification and of pollution).

BRIEF SUMMARY

The present disclosure aims to overcome these drawbacks by proposing a container solution allowing all the following:
- easy recovery at sea, secure including in the case of falling into the sea,
- participation in reduction of fixed costs related to transport (energy), all transport modes taken together, without reduction in commercial speed,
- protection of handling and inspection personnel (and end user), and
- without any modification to the container in terms of dimensions and handling and transport functionalities, in order to comply with current standards.

To achieve this objective, the disclosure relates to a stackable container used for the transport of products, comprising:
- a part forming a crate defining a base and four side walls and a top wall, secured to one another sealingly, produced mainly from plastics material,
- a door for sealed closure of the crate, forming a sealed box with the crate when closed thereon,
- a system for aspiration and compression of the gases contained in the closed box, and
- at least one gastight casing for storing the aspirated and compressed gases, secured to the box and forming a bracing frame during transport and a flotation buoy when the container is immersed.

The disclosure thus defined makes it possible, by virtue of the above main elements, to have a structure that is relatively lightweight and easy to maintain compared with steel containers, while guaranteeing health safety because of the aspiration of the gases in the internal space of the box, safer transport because of the chocking of the products, and facilitated recovery at sea because of the relative lightness of the container and the presence of flotation buoys.

The disclosure moreover may have one or more of the following additional features:
- the system for aspiration and compression of the gases contained in the closed box and/or the sealed casing for storage of the aspirated and compressed gases is disposed inside the box;
- the sealed storage casing is fixed in a region of the internal space of the box where this pouch, once inflated, is able to serve as a means for chocking the products being transported;
- the sealed storage casing is removably fixed inside the box;
- the system for aspiration and compression of the gases comprises an analyzer for the gases aspirated by the system for aspiration and compression of the gases;
- the analyzer comprises a unit for comparing the results of analysis of the aspirated gases with a database listing the analysis results obtained under similar conditions in the presence of known reference elements such as intoxicants, and/or a human presence;
- the bottom wall of the box comprises an integrated weight sensor;
- the crate of the container is obtained by molding;
- the crate is formed:
  - in a single piece by molding a material in a hollow parallelepipedal shape, or
  - formed by the assembly of a plurality of walls/panels obtained by molding a material in a flat shape defining, between the side walls and the base, sealed articulations allowing erection, erection in parallelepipedal form and then sealed fixing of the adjacent walls not connected by a sealed articulation;
- the box comprises a solar panel at least on its top wall;
- the container comprises corner parts allowing stacking of the container, and/or a weight sensor such as a strain gauge, and/or a system for connecting a solar panel, these parts or gauges or connection system being co-molded or overmolded with the crate;
- the door is obtained by molding and the frames providing hinging thereof are co-molded or overmolded with the door;
- the container comprises an external hatch for access to the internal space of the box able, in an open position, to allow entry into the internal space of a movable element for detecting the presence of an intoxicant and/or human presence, such as a robot or a small animal;
- the walls of the box are formed from plastics materials or plastic/metallic composite materials or an ecomaterial based on plastics material;
- the plastics material is formed by a polymer of the type consisting of expanded polystyrene or foam, polyurethane, polystyrene, epoxy resin, low- or high-density polyethylene, polyethylene with a very high molar mass UHMPE, polyphenylene sulphide, PEEK or biopolymer;

the material constituting the walls of the box is reinforced by glass fibers, carbon fibers, graphite fibers, a woven glass fabric or an epoxy resin fabric, or by bromine, or anti-UV treated;

the base of the crate is formed from wood, or composite wood including a plastic resin associated with wood fibers;

the sealed box comprises a metal framework 52 formed by beams and cross members 53, 54, 55, to which panels are fixed, forming the walls of the sealed box;

the box comprises frames 51 for hinging the door made from metal, ceramic, or rigid plastics material;

the box comprises corner parts enabling said container to be anchored and/or to be stacked on other containers made from metal, ceramic or rigid plastics material;

the gastight casing 13 comprises a main part 81 delimiting an internal space for storing products and a secondary part 82 provided with compartmentalization inserts 83 secured to the main part, and defining together compartments for storing fragile products;

the inserts consist of gastight casings for storing aspirated and compressed gases;

the inserts comprise, on their internal faces delimiting a compartment, protection for fragile products, of a neoprene type 84.

BRIEF DESCRIPTION OF THE DRAWINGS

Other data, features and advantages of the present disclosure will emerge from a reading of the following non-limited description, with reference to the accompanying figures, which show a non-limitative example embodiment of the disclosure and among which.

DETAILED DESCRIPTION

Figure 1:
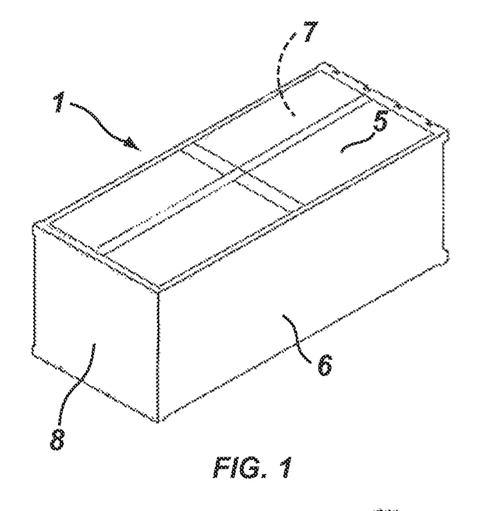
FIGS. 1 to 5 show a container according to the prior art.
Figure 2:
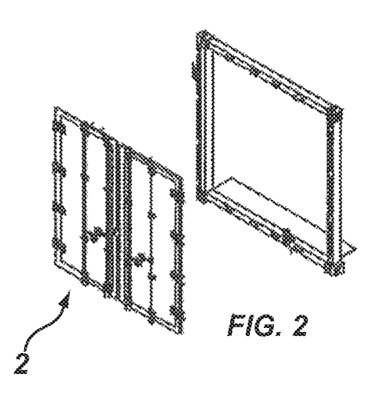
Figure 3:
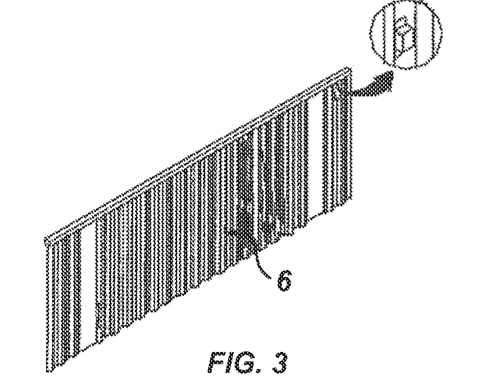
Figure 4:
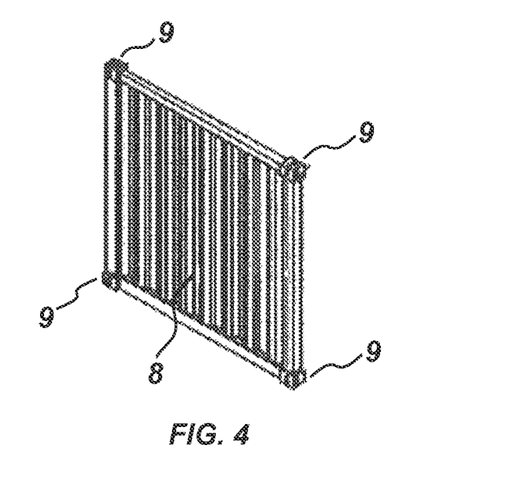
Figure 5:
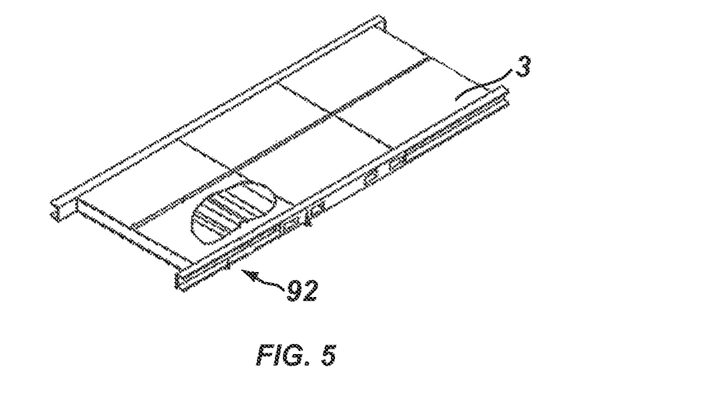
Figure 6:
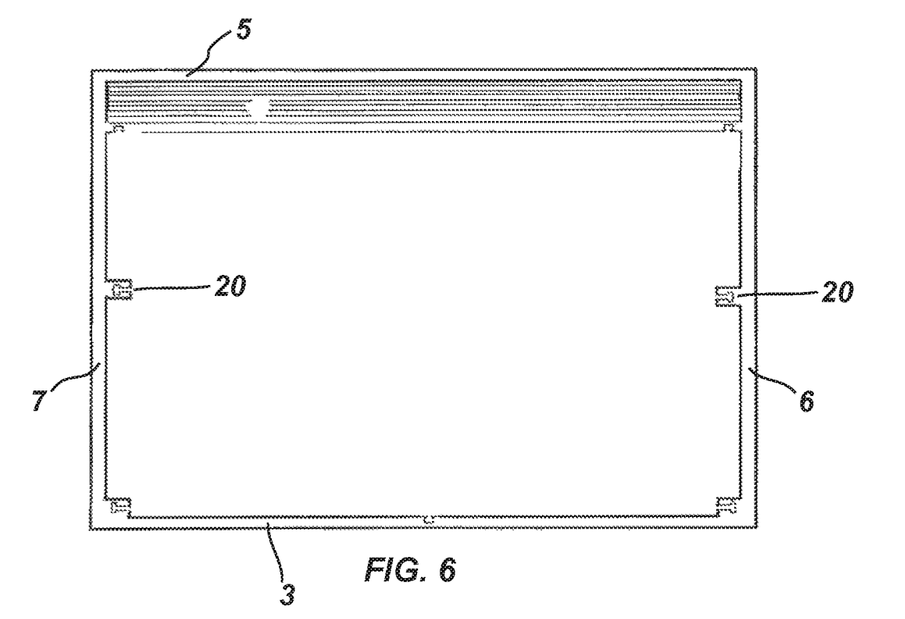
FIG. 6 shows, by a schematic front view on the open side, the container according to the disclosure without gastight casing.

In accordance with FIG. 1, the disclosure relates to an ISO container as defined above, comprising a substantially parallelepipedal main crate 1 enclosed by a door 2, the crate defining a bottom wall 3 for supporting the products to be transported, two side walls 6, 7 including ventilations (circular insert in FIG. 3), a top wall 5 and a wall 8 opposite to an opening closed by the door 2. When closed by the door 2, the crate 1 forms a container box 12.

The container further comprises corner parts 9 (in particular visible in FIG. 4) enabling said container to be anchored and/or to be stacked on other containers (and vice versa) in a conventional manner and in accordance with the standards relating to existing containers and in force at the time of their manufacture (for example, ISO 668:1995; and in particular appendix A thereof). It thus comprises at least four corner parts 9 on its top face, and/or on its bottom face.

In order to guarantee a relatively lightweight structure for a container of this type, of easy maintenance compared with steel ones, health safety vis-à-vis fumigation gases, safer transport and facilitated recovery at sea, while guaranteeing the required strength, the container according to the present disclosure comprises a crate, the walls of which are sealingly secured to one another, and produced primarily from plastic material, and further comprises, as can be seen in FIGS. 6 to 11: a system 11 for aspiration and compression of the gases contained in the closed box, including means for conveying the aspirated and compressed gases to gastight casings 13 for storing the aspirated and compressed gases, secured to the box and forming bags for wedging products during transport and flotation buoys when the container is immersed in water.

Figure 7:
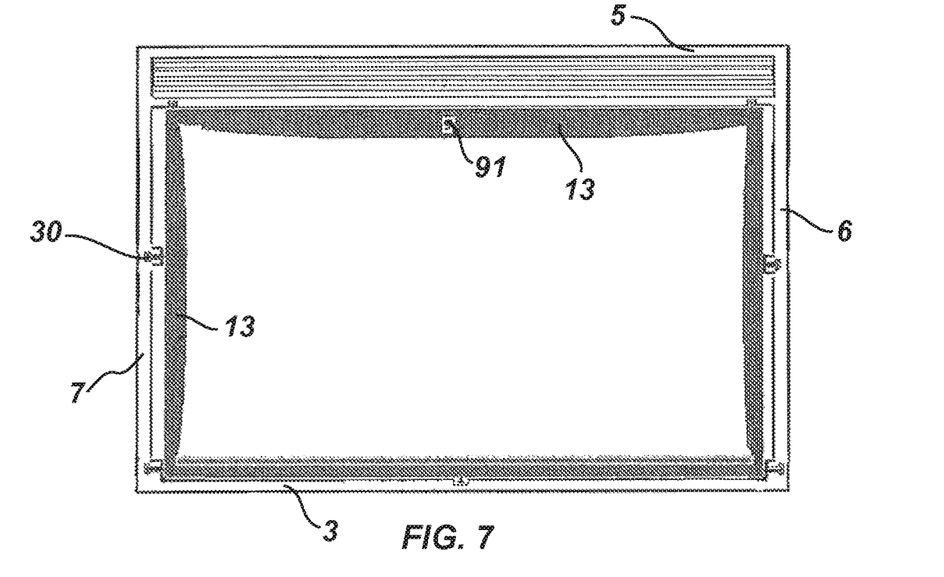
FIG. 7 illustrates, by a view similar to FIG. 6, the same container with gastight casings inflated by the gas aspirated in the internal space of the container.
Figure 8:
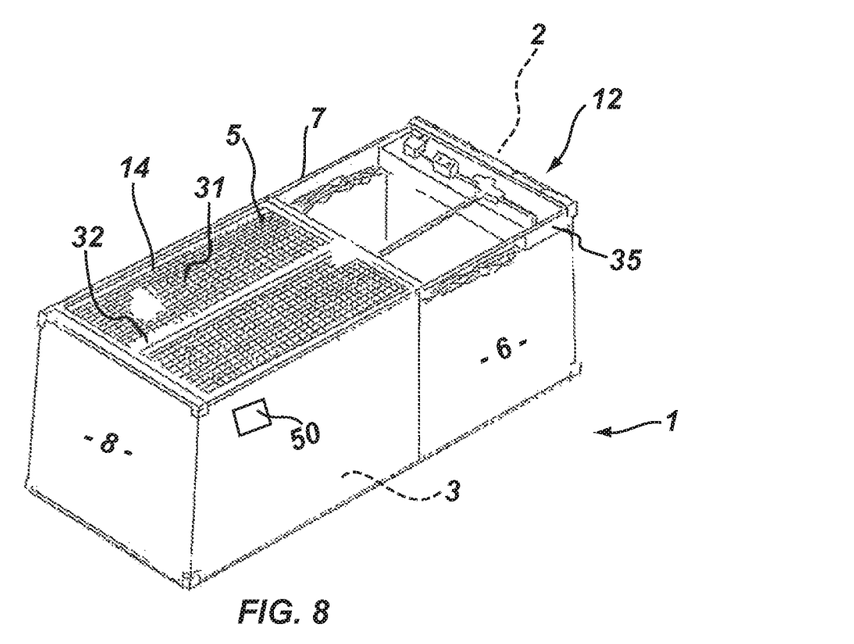
FIG. 8 shows a schematic perspective view of the container according to the disclosure, with cutaway of the roof revealing the aspiration system.
Figure 9:
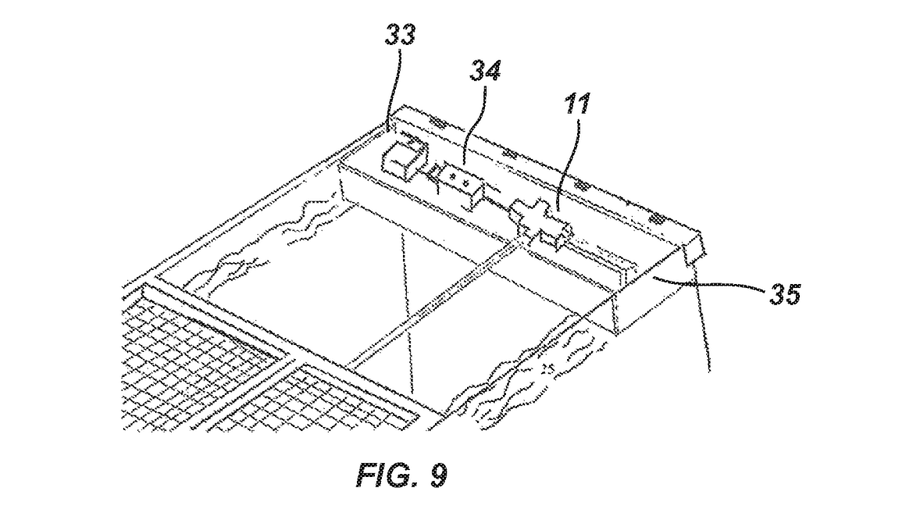
FIG. 9 is an enlargement of FIG. 8 centered on the aspiration system.

As shown, these casings 13 have, in the deflated state (not shown) the form of a deflated bag, and in the deployed state shown in FIG. 7 that of cushions extending along at least one internal wall of the box (the side walls, top and bottom (under a false floor) in the example illustrated) of the container. These casings are in fact fixed in a zone enabling it best to wedge the products transported without excessively impinging on the internal volume of the box. For example, on the bottom wall 3 of the container, zones will be defined where the products are to be disposed and zones necessarily left free since they will accept the bags once inflated.

The casing consists of an inflatable technical fabric with impervious stitching that can be removed from the container. Recesses 20 having, for example, a T shape in cross section, are provided on the internal walls of the container intended to be provided with casings, and the casings comprise lugs 30 fixedly engaging in these recesses 20.

In the example shown, the gas aspiration and compression system 11 and/or the gastight gas storage casing are both disposed inside the box. This compression system 11, may be a venturi, or may be replaced by another device such as a suitable refrigeration system or a food vacuum machine with reinjection of gas.

Preferably, an analyzer for the aspirated gases comprising a sensor 91 for capturing these gases (shown in FIG. 7) may be provided initially inside the casing and/or the gas aspiration pipe, with a connection accessible from the outside of the container (for example, from a hatch 50) to which an operator could connect an analysis terminal for analyzing the gases and compliance with thresholds prior to the opening of the container.

A variant embodiment consists of providing an orifice for the sealed introduction of an attached sensor, inside the casing and/or the gas aspiration pipe enabling an operator provided with this sensor and the associated analysis terminal to analyze the gases and compliance with thresholds prior to the opening of the container.

Various gas analysis techniques are particularly suited, for example, thermodesorption and gas chromatograph analysis, optionally coupled with mass spectrometry GC-MS.

The gastight storage casing is ideally removably fixed inside the box in order to be able to be extracted from the box with a view to cleaning thereof.

The gas aspiration and compression system may be activated after fumigation and/or just after closure of the door with a view to transport of the container in order to ensure that these fumigation gases and any other gas released by the products are trapped in the bags or cushions 13.

Ideally, the aspirated gases can be analyzed by an analyzer and the analysis results can be accessible from or transmitted outside the container.

An enclosable orifice can be provided on each gastight casing in order to empty the content thereof, this orifice being able to serve as a connection to a pipe for recovering these gases with a view to discharge thereof to the outside if these gases are inoffensive, or storage/recovery/treatment thereof if they are contaminated.

This analyzer may also comprise a unit for comparing the results of analysis of the aspirated gases with a database listing the analysis results obtained under similar conditions (identical internal volume, presence of the same number of bags) in the presence of reference elements such as intoxicants, and/or a human presence, and sending an alert message when the comparison tends to prove the presence of intoxicants or persons or animals inside the container.

Advantageous technical elements such as solar panels 14 may equip the container. Thus, outside the container (FIG. 8) there may be photovoltaic cells 31 gripped by a phosphorescent frame 32. They are connected to elements providing the supply to the measuring apparatus (sensors, gauge, door switch and alarm): a system provided with an inverter 33 (FIG. 11) and a battery 34 (FIG. 1) enclosed in a chest 35 disposed inside the container, for example, close to the sealing on the opening side. Advantageously, the solar panels may be integrated in the thickness of the top wall of the container, and/or its side walls.

The type of solar panel particularly suited is the lithium-battery solar panel.

Ideally, these solar panels may be connected via suitable cables and connections to a connection system, for example, accessible through the hatch 50, in order to supply any type of equipment with electrical energy, in particular the vehicle or boat that transports it.

Other advantageous technical elements may comprises weight sensors or strain gauges 92, distributed for example, inside the floor (FIG. 5), with a connection accessible from the outside of the container (for example, from a hatch 50) to which an operator could connect an analysis terminal in order to obtain a total weight of products transported in order to check conformity of the weight indicated before transport, in particular by sea. If the floor consists of a plurality of assembled plates each provided with a sensor, it is possible to obtain a distribution of the weight of products transported, in order to optimize distribution thereof on the floor, in particular for land transfer by road.

One variant embodiment consists of providing an orifice for the sealed introduction of an attached sensor, inside the casing and/or the gas aspiration pipe enabling an operator provided with such sensor and the associated analysis terminal to analyze the gas and compliance with thresholds prior to the opening of the container. Since the crate 1 and the door 2 are formed from mechanically strong plastics (ideally PET and having a thickness making it possible to achieve the required technical performances), the crate can advantageously be obtained by molding:
- directly in one piece in its parallelepipedal form (without the door), or
- by molding in a flat form defining, between the side walls and the base, sealed articulations (less thickness of plastics material for example) allowing erection, and then erection in the parallelepipedal form and then sealed fixing of the adjacent walls not connected by a sealed articulation. By this embodiment, the door can be formed in one piece with the crate.

In the case of this molding, the corner parts 9 allowing stacking of the container, and/or a weight sensor such as a strain gauge, and/or the system for connecting a solar panel, may be co-molded or overmolded with the crate.

Likewise, the frames for opening and closing of the door (frames ideally made from ceramic) will be co-molded or overmolded with the door.

In order to allow entry into the internal space of the movable element for detecting the presence of an intoxicant and/or a human presence, such a robot or a small animal, or inspection devices, the container may further comprise an external hatch 50 (FIG. 10) for access to the internal space of the box able, in an open position, to allow the movable element to pass and, in a closed position, to provide impermeability of the internal space. This hatch, around 50 centimeters, is accessible through the side wall of the container. It opens via a switch key that, when introduced into the switch, triggers an alarm (for example, audible) to prevent attempts at theft. Only the inspection personnel being authorized to use it.

General Structure of the Box

Figure 12:
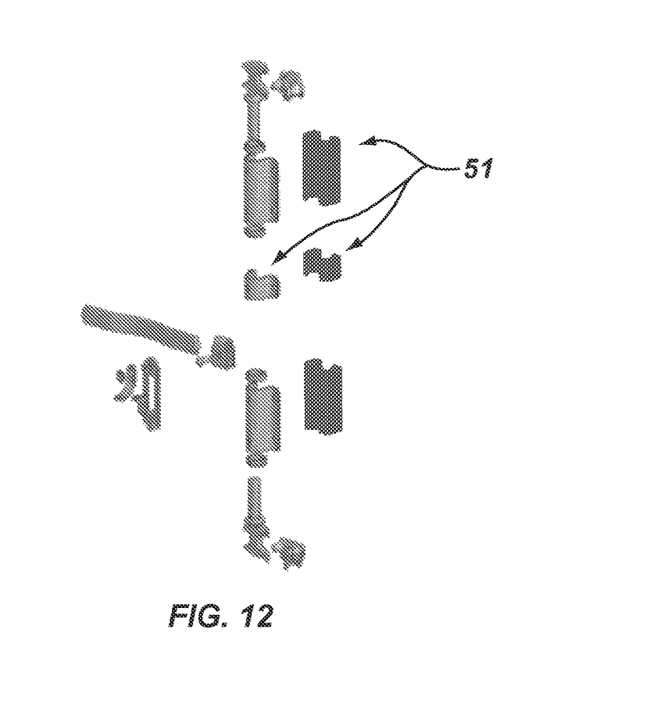
FIG. 12 shows, by a perspective view, the various metal, ceramic or plastic elements of a frame for hinging the closure door of the box of the container according to the invention.

1) The box of the container according to the disclosure may consist mainly of plastics material in that it may be formed by assembling walls made from plastics material or plastic reinforced with fibers or other elements, self-supporting and rigid, and to a lesser extent parts other than plastics, for example, metal (or ceramic) such as the corner parts 9 or the frame elements 51 as shown in FIG. 12.

In this case, it is possible for the crate 1 (side walls apart from the closure door and wall opposite to the door and optionally with a base 3) to be:
- formed in a single piece by molding a thermoplastic material in a hollow parallelepipedal form, or
- formed by assembling a plurality of walls obtained by molding a thermoplastic material in a flat form defining, between the side walls and the base, sealed articulations allowing erection, and then erection in the parallelepipedal form, with a sealed fixing of the adjacent walls not connected by a sealed articulation.

Figure 10:
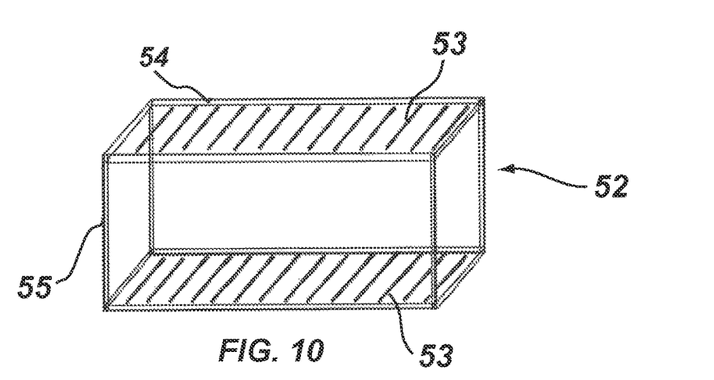
FIGS. 10 and 11 show, by schematic perspective views, respectively two variants of metal frames or frameworks that can equip the box of the container according to the disclosure to which the walls made from plastics material of the container are fixed.
Figure 11:
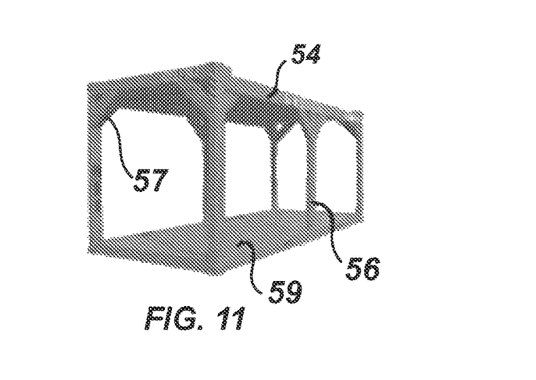

2) According to the variant embodiment illustrated in FIGS. 10 and 11, the crate is on the other hand formed from a composite material including a metal frame or framework 52 composed of beams 54 and uprights 55 forming frames delimiting a parallelepiped and cross members 53 connecting the two longest beams at the base 3 and top wall 5, FIG. 11 showing a variant in which the framework further comprises central uprights 56 and support girders 57 forming an angle between a beam and an upright.

Side walls, a top wall and a wall forming the door, produced from plastics material or a composite material based on plastics material, will supplement this frame in order to form the box.

A floor 59 will be supported by the bottom cross members or can be formed from wood, or composite wood material including a plastic resin associated with wood fibers.

Neoprene can be used for the joints between the various elements.

Types of Plastics Material Possible

Whether or not the crate and the door closing it are provided with a framework, reinforcements and/or metal frames, the walls or panel forming it will be formed mainly from plastic material (more than 70%, preferably 80% by weight, even more preferably 90% by weight) and composed of:
- plastic material or an eco-material based on plastic material,
- the plastic material may be formed by a polymer of the expanded polystyrene type or foam, polyurethane, polystyrene, epoxy resin, low- or high-density polyethylene, polyethylene with a very high molar mass UHMPE, polyphenylene sulphide, PEEK or a biopolymer type,
- the material forming the walls of the box may be reinforced by glass fibers, carbon fibers, graphite fibers, by a woven glass fabric, an epoxy resin fabric, by bromine, or anti-UV treated.

Figure 13:
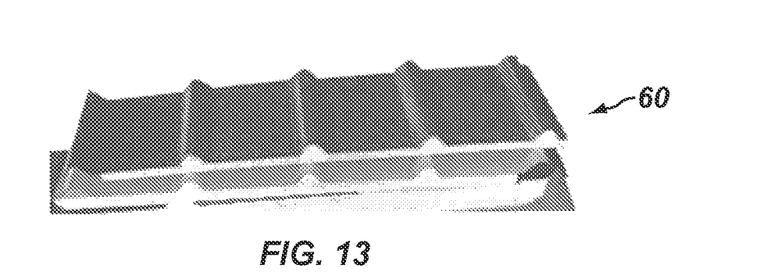
FIGS. 13 to 15 show respectively, by perspective views, a side view and a plan view, a wall of the box of the container according to the disclosure according to a first variant embodiment.
Figure 14:
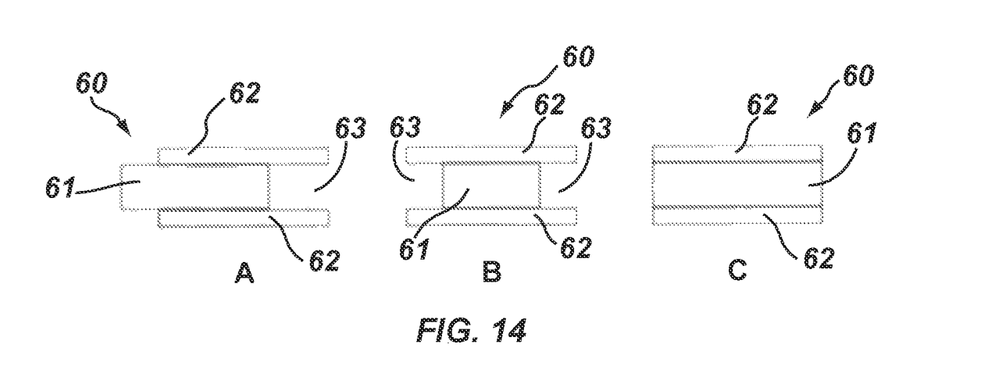
Figure 15:
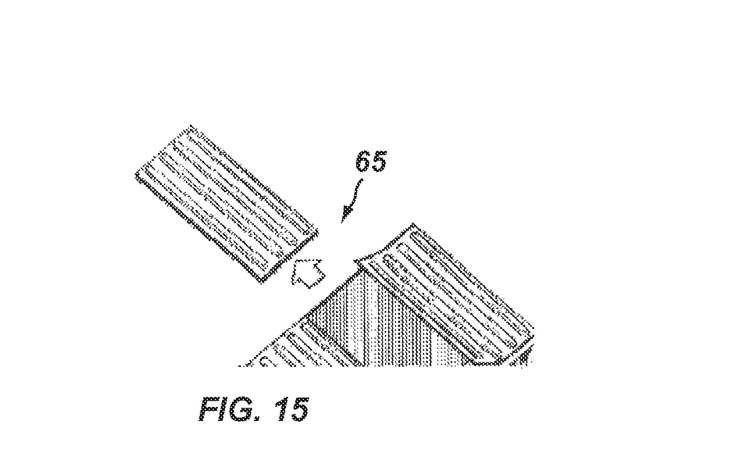

In the examples shown in FIGS. 13 to 15, the plastics material forming a wall of the container comprises a sandwich structure 60.

In accordance with FIG. 13, this structure comprises an inner insulation layer 61, in particular thermal, for example, of expanded polystyrene material EPS foam interposed between two sheets 62 providing the rigidity of the panel, for example, of the PU or polyurethane XPS or PS (polystyrene) type.

The expanded plastic of the inner layer advantageously comprise two parts made from molded expanded plastic, a bottom part comprising alveoli, and a top part covering the bottom part and fitting therein.

The outer sheets may also consist of a panel made from anti-UV treated glass fiber FRP, with a thickness of 50 to 100 mm.

The total thickness of the panel used may between 40 and 350 mm according to the degree of thermal insulation required and/or the packaging of the products being transported and/or the internal volume of the container required.

Two successive panels will be assembled side by side and fixed in pairs with the interposition of seals and/or expansion joints.

In accordance with FIG. 14(A), the arrangement of the rigid sheets 62 and of the insulating intermediate layer 61 may advantageously allow lateral fitting together of two adjacent panels of this type comprising a sandwich structure 60, the inner layer 61 projecting on one side laterally vis-à-vis the lateral edges of the rigid sheets and on the side leaving a space 63 for accepting the protruding part of the inner layer 61 of an adjacent panel. Two adjacent panels are then assembled by the edges of the protruding part of the inner layer on the rigid sheets of the adjacent panel, for example, by adhesive bonding or lamination.

On the other hand, in accordance with FIG. 14(B), the inner layer 61 may be shorter than the rigid sheets 62. Two adjacent panels are then assembled by the edges in contact of the rigid sheet 62, for example, by adhesive bonding or lamination.

The proposal illustrated in FIG. 14(C), comprises an inner layer 61 and rigid sheets 62 of the same length, and the panel resulting therefrom is fixed by its edge to an adjacent panel of the same type, for example, by adhesive bonding or lamination.

Two successive panels will be assembled side by side and fixed in pairs with the interposition of seals and/or expansion joints.

FIG. 15 illustrates a possible fitting together of juxtaposed panels 65 in order to form a container.

This panel is generally prefabricated, and is 40-350 mm thick.

This material forms a thermal insulation complying with ISO 2009:2008.

The advantage is easy mechanization of assembly by ensuring that the parts assemble easily.

Figure 16:
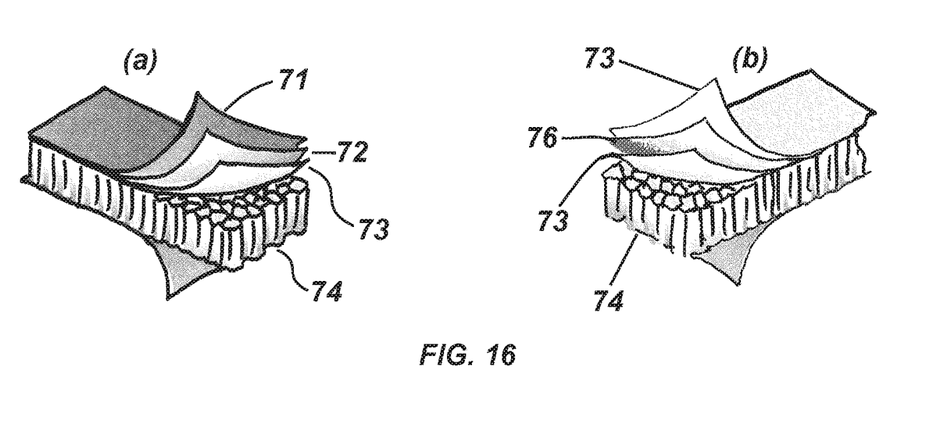
FIGS. 16 and 17 illustrate, by perspective views, a wall of the box of the container according to the disclosure according to a second variant embodiment with internal alveoli.
Figure 17:
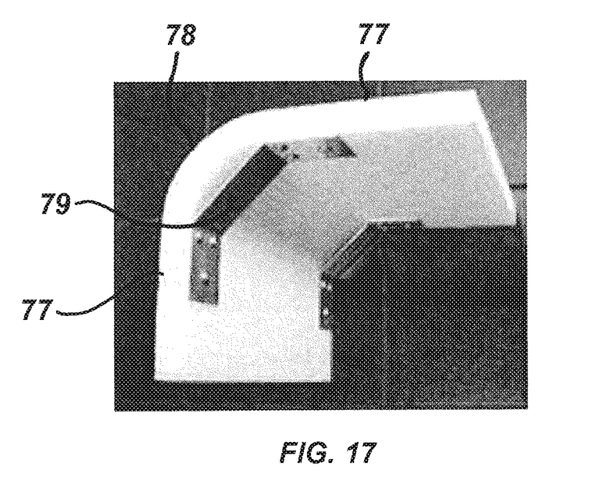

In the examples shown in FIGS. 16 to 17, the plastics material constituting a wall of the container comprises a panel of the FRP or fiber reinforced plastic type;

FIG. 16(a): a sandwich honeycomb structure consisting of a sheet of plastic 71 reinforced by glass fibers, a non-woven fabric 72, a sheet of polypropylene 73, and a polypropylene honeycomb structure 74.

FIG. 16(b): a sandwich honeycomb structure consisting successively of a sheet of polypropylene (PP) 73, a PP woven fabric 76 or a layer of glass fiber, a PP sheet 73 and a PP honeycomb structure 74.

The anti-UV treated FRP or glass fiber reinforced plastic of the type:
- FRP-4, FR-4. This is an epoxy resin composite reinforced with glass fiber. Its properties may vary according to the directions of its structure (parallel or perpendicular to the fibers).
- FR-4 ESD. This material offers high mechanical strength at ambient temperature.
- FRP-007
- FRP with gel layered or not.

In accordance with FIG. 17, this material can be shaped and folded so as to define two perpendicular adjacent walls 77 and an intermediate portion at an angle 78 and is thus entirely suitable for forming the crate of the container according to the disclosure. Metal reinforcement 79 can be attached in order to hold the walls in their position perpendicular to each other.

It is possible to use other types of plastics material:
—Polyethylene PE of Low Density LDPE or High Density HDPE.

Preferentially, high-density polyethylene will be used in particular, treated against the effects of an alkaline environment.

A woven glass fabric, an epoxy resin fabric and/or bromine may be added thereto.

It may also be extruded or stress relieved.

It is possible to opt for a polyethylene rotary molded product since it is anti-rot and insensitive to corrosion. They are self-colored and are not affected either by impacts or scratches.

They are resistant to solvents and hydrocarbons. These products may be made to order in order to comply with the military standard MIL-STD 810G (environmental resistance).

It is also possible to opt for an HDPE resulting from thermoforming since it is also resistant to oils, solvents and hydrocarbons, but also water repellent and resistant to chemical products, to abrasion and to wear. It also offers excellent resistance to impacts and is lightweight. It has low moisture absorption, and high tensile strength. HDPE is also non-toxic and non-colored.

The use of polyethylene with a very high molar mass UHMPE can also be recommended.

—Polyphenylene Sulphide PPS

This offers very good properties of electrical insulation, good hardness and rigidity, very high resistance to high thermal deformation, to climatic effects and to chemical agents. Favored for very particular civil uses, for example, for the North West Passage.

—Polyetheretherketone PEEK

PEEK, to which in particular glass fibers are added in order to reduce the expansion ratio and to increase the bending modulus. Carbon and graphite fibers may be added to the PEEK in order to make therefrom a polytetrafluoroethylene PTFE. Favored for very specific applications, for example, requests from the army (armored equipment).

—Ecomaterials or Bioplastics:

For example, the biodegradable ECOGEHR® plastic range

PLA-L, that is to say any biopolymer based on renewable raw materials, may be used.

Recyclable polypropylene obtained by injection, blow molding and with a hollow structure is an advantageous ecological alternative.

It makes it possible to obtain objects with a reinforced frame via a honeycomb structure that provides a certain stability for the product and enables it to contain heavy objects such as mechanical parts and tooling.

Structure of the Gastight Casing

The purpose of the inflatable casing is to wedge the goods so that they do not move during transport. Some products are liable to tear this casing if the latter is not sufficiently robust. These cases of early damage may occur during the inflation process itself or during possible situations of compression of the goods. However, if the goods are not properly chocked, they may move and damage the whole of the structure.

The inflation-chocking process is therefore essential. It is provided by an electromechanical system for aspiration of the ambient air in which the enclosed goods are situated. The air decanted into the casing must, be means of a greater or lesser compression, block the goods until they are released at the point of delivery or customs inspection.

Among the most satisfactory fabrics, there is PVC, preferably flame retardant, optionally anti-UV treated and preferably coated, to which according to circumstances an inner protective thickness for the products may be added, for example, made from neoprene (rubber based on polychloroprene) in order to provide better protection of the casing by absorption of impacts.

Another advantageous fabric is a multilayer quilted fabric, assembled by stitching or technical welding, and impervious, with a view to ensuring excellent technical insulation and for resisting abrasion.

If the fabric is used in the form of fabric panels, these will be assembled by stitching or technical welding coupled with sealing and expansion joints.

Moreover, this material has qualities of the type: lightness, thermal insulation, elasticity and resistance to crushing and damage. It is therefore a flame-retardant so-called technical fabric but necessarily anti-UV treated because of its position inside the container. A polyurethane PU coating may optionally be envisaged. It must comply with specific standards in terms of texture, mesh opening, resistance to rupture, elasticity, weave, permeability to air, thickness, proportion of extractable materials and weight. Examples of standards current at the present time NF EN 1049/NF G07-155, NF EN ISO 13934-1/NF G07-001, NF G07-111, NF EN ISO 9237, ASTMD2257, ISO 3801/NF G07-150/NF EN ISO 5084/NF G07-153.

In order to provide better circulation of air and to prevent in particular the formation of a pocket where a source of moisture might become established and also possible crushing of certain products during the aspiration process, it is possible to insert a flexible deformable insert secured to the casing for fragile elements actually inside the inflatable structure.

Figure 18:
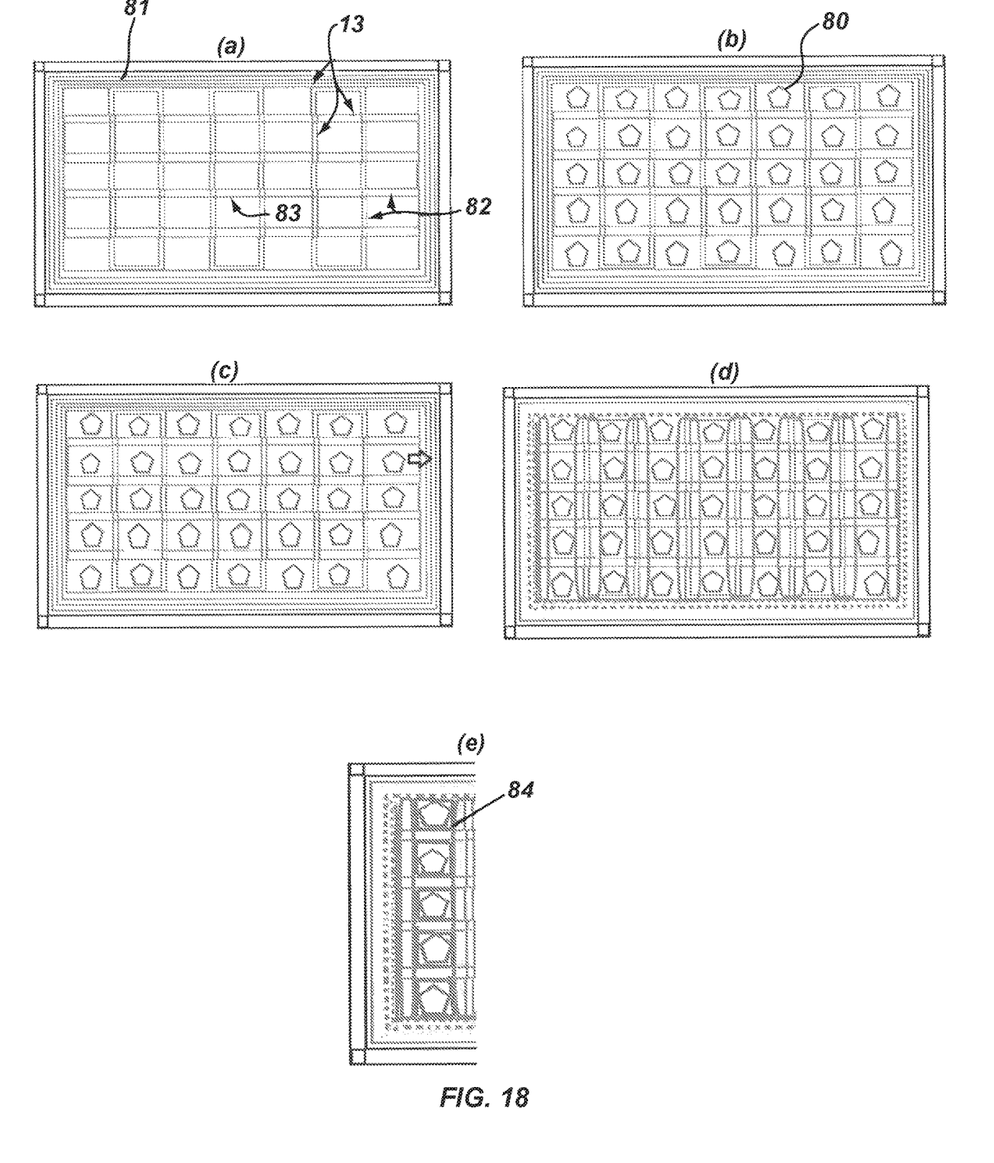
FIG. 18 shows a variant embodiment of the gastight envelope for storing the aspirated gases according to which the internal space of the container is compartmentalized in order to individually protect the transported products when the latter are fragile.

Thus, in accordance with FIG. 18, according to a variant embodiment of the sealed casing for storing aspirated gases, this proposes the possibility of compartmentalizing the internal space of the container, by means of secondary casings inflated with the aspirated and compressed gases in order to protect the transported products individually when the latter are fragile.

To this end, the gastight casing 13 comprises a main part 81 delimiting an internal space for storage of products 80 and a secondary part 82 provided with compartmentalization inserts 83 secured to the main part and in communication with the gas aspiration and compression system, either via the main part 81 or independently thereof.

The main part 81 may consist of rectangular sheets, the lateral edges of which are fixed sealingly to the internal face of each wall of the box (including the door) and the secondary part 82 may consist of one or more bags secured to one another. For example, these bags may define, seen from above, a plurality of galleries (3 in FIG. 18(a)) with a rectangular profile spaced apart from one another, and perpendicular to these, rectilinear bags disposed perpendicular to the long edges of the galleries, and provided with slots for the walls of the galleries to pass. The height of the walls of the galleries and of the bags will be adapted to that of the products (FIG. 18(b)). The galleries and bags may be fixed to the fabric of the main part, and optionally in air-flow communication therewith or directly with the gas aspiration and compression system in order to be inflated (FIG. 18(d)) when the internal air of the container is aspirated (FIG. 18(c)).

Ideally, the inserts comprise, on their internal faces delimiting a compartment, protection for the fragile products, of the neoprene 84 type.

In some cases, on request, additional protection may be installed.

This decompression device must be designed so as to prevent entry of any foreign body, leakages of gas and any dangerous excess pressure.

The closures of the orifices intended for the entry and discharge of air contained in the casing must be designed and produced so as to remain closed and sealed under normal transport conditions. The closures must be provided with seals or other sealing elements, unless they are sealed through their very design.

Finally, under no circumstances must the loader fill the container with known flammable product without informing all persons that will have to handle said container of this.

According to an advantageous embodiment, the container may include geolocation elements such as GPS beacons supplied with power by virtue of the production of autonomous energy (plug and play system in particular).

The disclosure is not limited to intermodal containers of the ISO type as defined above, but concerns all types of container for the storage and/or transport of products to be chocked and where the gases contained in the internal space defined by the container must preferably be aspirated in order to prevent any health and/or explosion risk.

The invention claimed is:

1. A stackable container used for transport of products, comprising:
   a crate defining a base and four side walls and a top wall, secured to one another sealingly, formed primarily from plastic material;
   a door for sealed closure of the crate, forming a sealed box with the crate when closed thereon;
   at least one gas-tight casing secured inside the crate and forming a bracing bag during transport and a floatation buoy when the stackable container is immersed in water; and
   a system configured to compress gases contained in the sealed box into the at least one gas-tight casing, the at least one gas-tight casing configured to store the compressed gases.

2. The stackable container of claim 1, wherein the system is disposed inside the crate.

3. The stackable container of claim 2, wherein the at least one gas-tight casing is fixed in a region of internal space of the crate where the at least one gas-tight casing, once inflated, is able to serve as a means for chocking the products being transported.

4. The stackable container of claim 1, wherein the at least one gas-tight casing is removably fixed inside the crate.

5. The stackable container of claim 1, further comprising an analyzer for gases aspirated by the system.

6. The stackable container of claim 5, further comprising a unit for comparing results of analysis of the aspirated gases with a database listing analysis results obtained under similar conditions in the presence of known reference elements.

7. The stackable container of claim 1, wherein the base comprises an integrated weight sensor.

8. The stackable container of claim 1, wherein the crate is formed by molding.

9. The stackable container of claim 8, wherein the crate is: formed in a single piece by molding a material in a hollow parallelepipedal shape or formed including sealed articulations allowing erection of the crate in parallelepipedal form and then sealed fixing of adjacent walls not connected by the sealed articulations.

10. The stackable container of claim 8, further comprising a solar panel on the top wall.

11. The stackable container of claim 1, further comprising at least one of:
   corner parts allowing stacking of the stackable container;
   a weight sensor; and
   a system for connecting a solar panel; and
wherein the corner parts, weight sensor, and/or system for connecting a solar panel are co-molded or overmolded with the crate.

12. The stackable container of claim 1, wherein the door is obtained by molding and frames providing hinging thereof are co-molded or overmolded with the door.

13. The stackable container of claim 1, further comprising an external hatch for access to internal space of the crate.

14. The stackable container of claim 1, wherein the four side walls and top wall of the crate are formed of plastic material, a plastic/metallic composite material, or an eco-material based on plastic material.

15. The stackable container of claim 14, wherein the plastic material comprises at least one of expanded polystyrene or foam, polyurethane, polystyrene, epoxy resin, low- or high-density polyethylene, polyethylene with a very high molar mass UHMPE, polyphenylene sulphide, PEEK, and biopolymer.

16. The stackable container of claim 14, wherein material constituting the four side walls and top wall of the crate is reinforced by glass fibers, carbon fibers, graphite fibers, a woven glass fabric or an epoxy resin fabric, or by bromine, or are anti-UV treated.

17. The stackable container of claim 1, wherein the base of the crate is formed from wood, or composite wood including a plastic resin associated with wood fibers.

18. The stackable container of claim 1, the crate comprises a metal framework formed by beams and cross members, to which panels are fixed, forming the four side walls of the sealed box.

19. The stackable container of claim 1, wherein the crate comprises frames for hinging the door made from metal, ceramic, or rigid plastic material.

20. The stackable container of claim 1, wherein the crate comprises corner parts enabling the stackable container to be anchored and/or to be stacked on other containers.

21. The stackable container of claim 1, wherein the at least one gas-tight casing comprises a main part delimiting an internal space for storing products and a secondary part provided with compartmentalization inserts secured to the main part, and defining together compartments for storing fragile products.

22. The stackable container of claim 21, wherein the compartmentalization inserts comprise additional gas-tight casings for storing compressed gases.

23. The stackable container of claim 21, wherein the compartmentalization inserts comprise neoprene, and wherein internal surfaces of the compartmentalization inserts define a space for protecting fragile products.

* * * * *